Dec. 23, 1930.  W. K. GOSSE  1,786,397
VALVE MECHANISM
Filed Aug. 16, 1928   3 Sheets-Sheet 1

William K. Gosse
INVENTOR
BY Victor J. Evans
ATTORNEY

Dec. 23, 1930.                W. K. GOSSE                1,786,397
                             VALVE MECHANISM
                          Filed Aug. 16, 1928        3 Sheets-Sheet 2
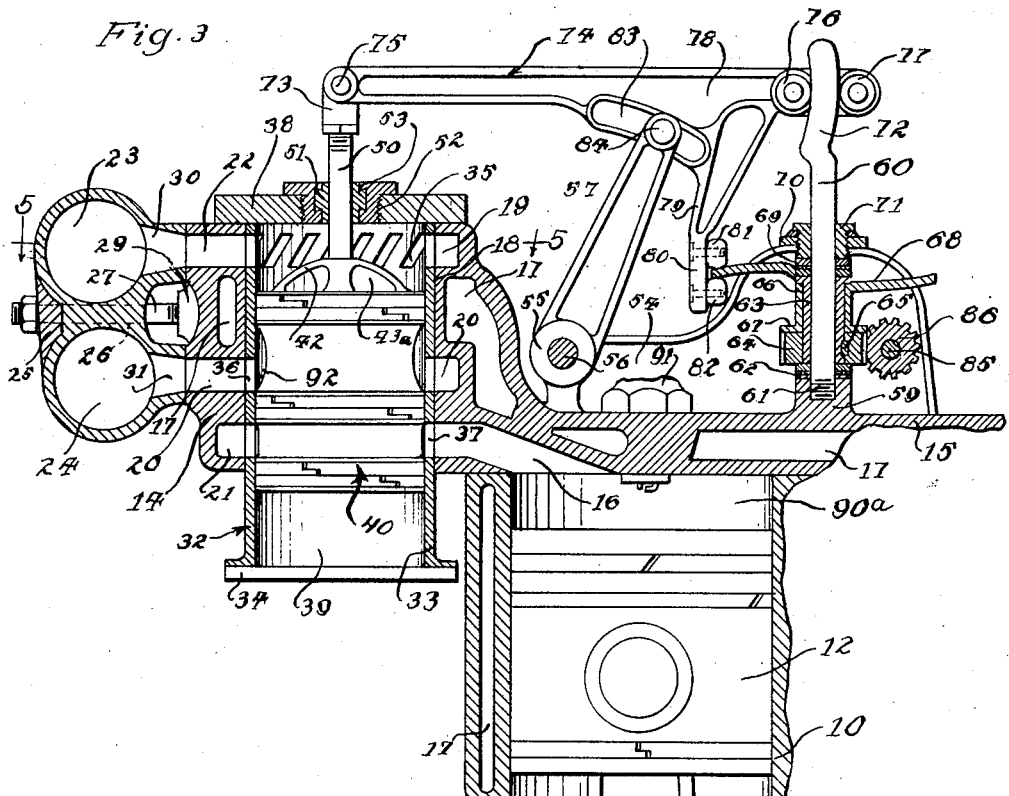
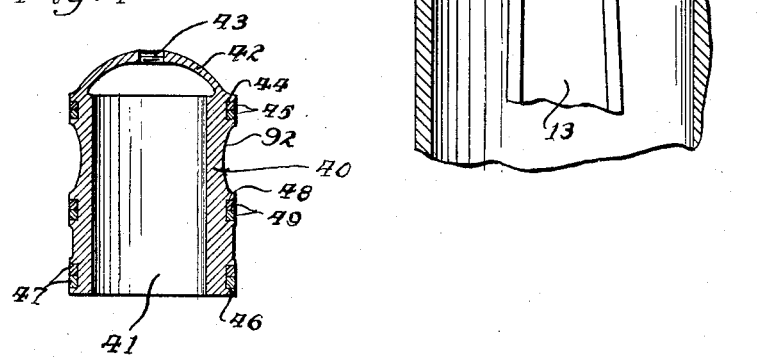
William K. Gosse
INVENTOR
BY Victor J. Evans
ATTORNEY Dec. 23, 1930. W. K. GOSSE 1,786,397
VALVE MECHANISM
Filed Aug. 16, 1928  3 Sheets-Sheet 3
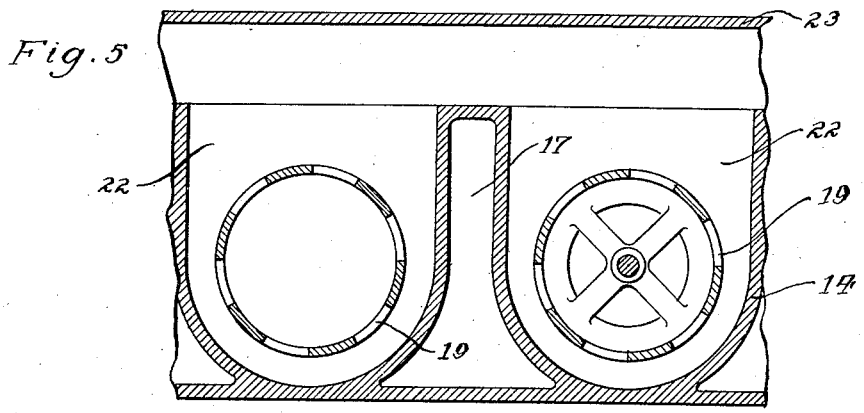
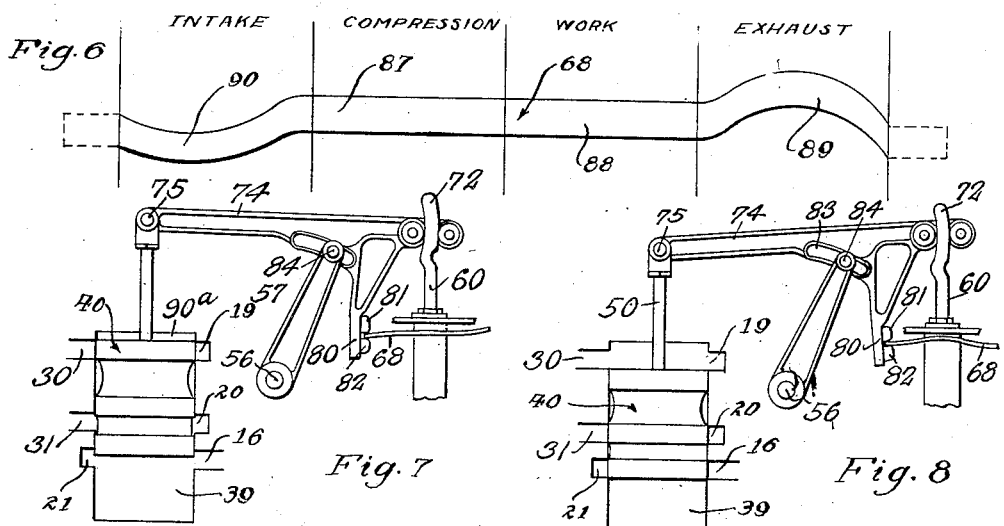
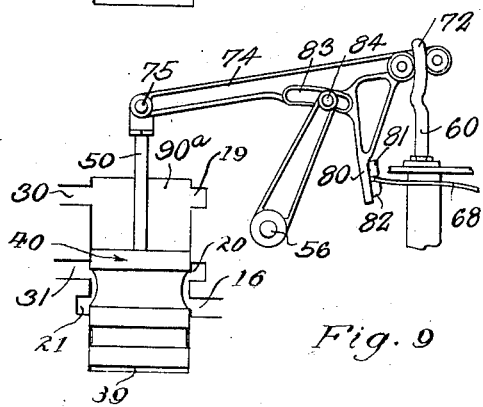
William K. Gosse, INVENTOR
BY Victor J. Evans, ATTORNEY Patented Dec. 23, 1930

1,786,397

UNITED STATES PATENT OFFICE

WILLIAM KARL GOSSE, OF CHICAGO, ILLINOIS

VALVE MECHANISM

Application filed August 16, 1928. Serial No. 300,089.

This invention relates to certain novel improvements in valve mechanisms for internal combustion engines and the like, and has for its principal object the provision of an improved construction of this character which will be highly efficient in use and economical in manufacture.

It is well understood that the carburation of fuels such as are employed in connection with internal combustion engines and the like can be most efficiently carried out when a constant ratio is maintained between the fuel and air supplies. It is therefore the salient object of my invention to provide a valve construction for internal combustion engines which will be so arranged that a fuel mixture of a constant constituency may be introduced into the cylinders.

Another object of the invention is to so arrange a valve construction for internal combustion engines that the incoming fuel will be directed through a heated member so that this incoming fuel will tend to take up part of the heat of said member and thereby increase the fuel temperature and at the same time effectively cool said heated member.

Another object of the invention is to provide a valve member which will be so arranged that it will be adjustable in order that the amount of fuel supplied to the cylinder may be varied in order to control the power delivered from, and the speed of, operation of the internal combustion engine motor with which the device is associated.

Another object of the invention is to provide a valve which will be so arranged that it will be cam actuated and I preferably construct the device so that these cams may be located in juxtaposition to the valves preferably on the upper side of the motor.

A still further object of the invention is to arrange this valve construction so that the magnitude of the intake and exhaust ports may be maintained substantially constant between the manifold and the cylinder to provide an efficient path between the manifolds and the cylinders.

Other objects will appear hereinafter.

The invention consists in the novel combination and arrangement of parts to be hereinafter described and claimed.

The invention will be best understood by reference to the accompanying drawings, showing the preferred form of construction and in which:—

Fig. 3 is a view taken substantially on the line 3—3 on Fig. 1;

Fig. 4 is a vertical sectional view of a preferred form of construction for the valve member employed in my device;

Fig. 5 is a view taken substantially on the line 5—5 of Fig. 3;

Fig. 6 is a diagrammatic view depicting a layout of the cam member employed to operate my improved valve;

Fig. 7 is a partially diagrammatic view depicting my improved valve in the position occupied during the intake stroke of the engine;

Fig. 8 is a view substantially similar to Fig. 7 depicting the parts in the position occupied during the compression and work strokes; and Fig. 9 is a view substantially similar to Figs. 7 and 8 depicting the parts in the position occupied during the exhaust stroke.

Figure 1:
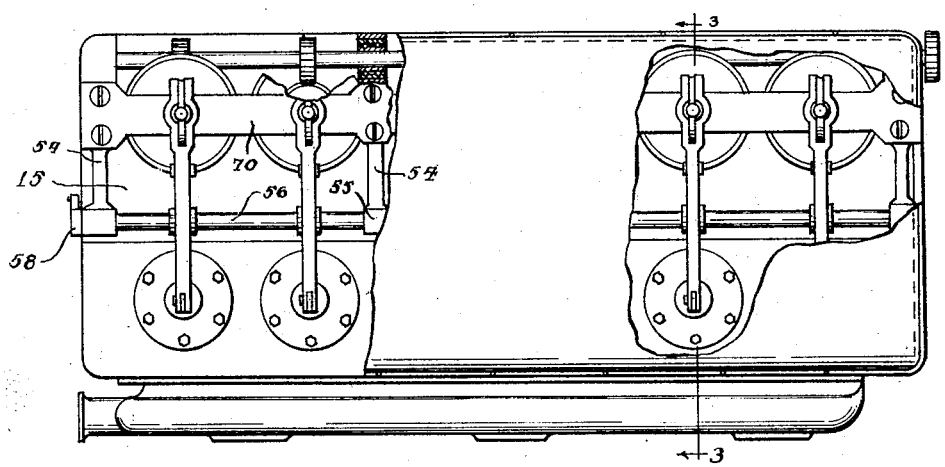
Fig. 1 is a top plan view of an internal combustion engine, in which certain parts are broken away, which has associated therewith a preferred embodiment of my improved valve.

In the drawings, wherein the preferred embodiment of my invention is illustrated, 10 indicates the block of an internal combustion engine which may be of any improved form or type and which in the present instance is arranged to include six cylinders 11. In each of the cylinders 11, pistons 12 are reciprocally arranged which have the usual pitmen 13 connected thereto that are adapted to transmit the movement of the pistons 12 to the usual crank shaft (not shown).

In Figs. 3 and 4 I have illustrated a preferred form of construction for my improved valve which is of the spool type. This spool valve construction includes a housing 14 that is preferably formed as a unitary part of the head 15 of the internal combustion engine. While this unitary construction is preferable, it is to be understood that this valve housing might be arranged separately without departing from the purview of my invention. The head 15 is preferably associated with the block in any approved manner and is arranged so as to embody passages such as 16 that establish communication between the interior of the spool valve housings 14 and the cylinders 11. The block 10, the head 15, and the valve housing 14 preferably have interconnected water chambers 17 provided therein which may be arranged in any approved manner so as to supply a cooling medium around mechanisms in the manner and for the purpose well understood in the art.

The valve housings 14 preferably have bores 18 extending therethrough and at spaced apart points in the extent of the bores 18 preferably at the points indicated by 19, 20, and 21 recesses are formed in the body of the housings 14 which open into the bores 18. These recesses are all arranged in a manner substantially similar to that shown in Fig. 5 wherein it can be seen that these passages terminate in relatively wide portions 22 that open into portions to be described hereinafter.

Figure 2:
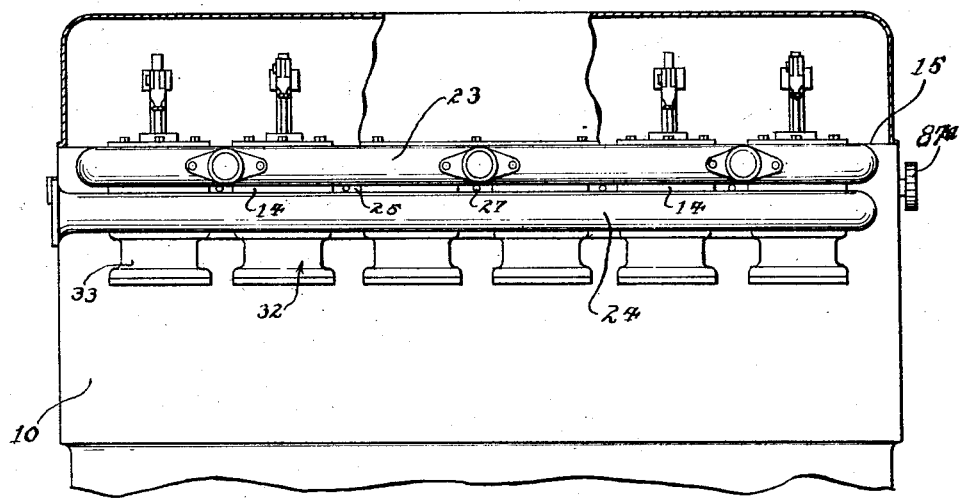
Fig. 2 is a side elevational view of the engine illustrated in Fig. 1 in which certain parts are broken away.

Arranged on the side of the engine and preferably disposed so that they will be coextensive with the valve housings 14 are the intake and exhaust manifolds of the engine. The intake manifold 23 is preferably arranged above the exhaust manifold 24. At suitable points along the extent of these manifolds as illustrated in Fig. 2, pads 25 are provided that are disposed between the manifolds and which have openings 26 formed therein. Suitable bolt members 27 are extended through these openings 26 and engage suitable pads 29 provided on the valve housings 14 and in this manner these manifolds are connected to the valve housings. At suitable points along the extent thereof, the intake manifold 23 is provided with passages 30 (Fig. 3) and these passages 30 are arranged so that they will communicate with the portions 22 of the intake passages 19. Similarly the exhaust manifold 24 is provided with openings 31 that communicate with the portions 22 of the exhaust passages 20. The recesses 21 communicate with the passages 16 to establish communication between the bores 18 and the interior of the cylinders 11.

Arranged within the bore 18 is a sleeve 32 which includes a portion 33 that extends below the lower end of the housings 14. The lower end of the sleeve 32 is preferably closed by a plate 34 that is connected thereto in any desired manner. In the sleeve 32, in the portion thereof disposed in alignment with the recess 19, a plurality of ports are provided which are indicated by 35 and these ports are preferably arranged so as to establish communication between the interior of the sleeve in the passage 19. As illustrated best in Fig. 3, the ports 35 are disposed at an angle from the vertical, the purpose of which will be made apparent hereinafter. In the sleeve 32, in the portion thereof disposed in alignment with the passage 20, are a plurality of ports 36 which are preferably arranged similarly to the ports 35. In the sleeve 32, in the portion thereof in alignment with the recess 21, ports 37 are preferably arranged substantially similar to the ports 35. Ports 35, 36, and 37 are all of the same height as the recesses with which they are to communicate. The upper side of the bore 18 and therefore the upper end of the sleeve 32 is preferably closed by means of a plate 38 that is connected to the housing 14 in any approved manner. It will thus be seen that both ends of the sleeve 32 are closed and thus the bore of this sleeve forms a cylinder like compartment. The sleeve 32 is preferably arranged within the bore 18 with what is known as a press fit although it is to be understood that it may be retained therein in any other desired manner.

Disposed within the bore of the sleeve 32, which will be known hereinafter as the valve cylinder 39, is a valve member 40 which is of the spool type which is reciprocal in the valve cylinder 39 in a manner substantially similar to the piston. As illustrated best in Figs. 3 and 4 this valve member 40 is arranged in the form of a sleeve so as to have a passage 41 extending therethrough. At the upper end of the valve 40 upwardly converging arms 42 are provided which have spaces 43a arranged therebetween and these arms 42 are converged substantially on the vertical center line of the valve 40 and at this point a screw threaded opening 43 is provided. On a periphery of the valve member 40, adjacent the upper end thereof, is a recess 44 in which piston rings 45 are mounted which are preferably of the step joint type (see Fig. 3) and which are arranged so that the joints thereof are disposed out of alignment and if desired these rings may be pinned so as to maintain this relationship between the joints. At the opposite end of the valve member 40, a groove 46 is provided which has piston rings 47 mounted therein that are arranged substantially similar to the rings 45. Arranged intermediate the grooves 44 and 46 at a point to be described more fully hereinafter is a groove 48 which has rings 49 mounted therein that are arranged substantially similar to the rings 45 it being understood that the rings 45, 47, and 49 are of the same type and construction.

A valve stem 50 has one end thereof disposed in the screw threaded opening 43 and this valve stem 50 is projected through a suitable packing construction generically indicated by 51 that is mounted in the opening 53 in the plate 38 and which is retained by the packing nut 52.

Arranged at spaced apart intervals on the upper side of the head 15 are upwardly extending web members 54 which have bearings 55 provided therein in which a control shaft 56 is journaled. Mounted on the control shaft 56 in alignment with each of the valve housings 14 are arm members 57 which are fixed to the shaft 56 so as to be movable therewith. At one end of the shaft 56 a bell crank lever 58 is provided, and this bell crank lever is connected to a suitable operating mechanism whereby a rocking movement may be imparted to the shaft 56 in order that the arms 57 may be rocked transversely of the head 15.

In alignment with the bearing members 55 bosses 59 are provided on the upper side of the head 15. Studs 60 are provided which have the lower end portions thereof screwthreadedly fitted in openings 61 in the bosses 59. At the upper end of the boss 59 and disposed around these studs 60 is a thrust bearing 62. A sleeve 63 is provided around the studs 60 and extends upwardly therealong for a pre-determined distance. Disposed around the sleeve 63 at the lower end thereof is a pinion 64 which is keyed to the sleeve 63 as indicated at 65. A sleeve 66 is fitted around the sleeve 63 and is suitably connected thereto and includes a foot portion 67 that rests on the pinion 65. At the upper end of the sleeve 66 a cam plate 68 is provided which will be described more fully hereinafter. Mounted above the upper end of the sleeve 66 is a thrust bearing 69. Extending between the webs 54 is a plate member 70 (Figs. 1 and 3). A suitable nut member 71 is screw-threadedly fitted in openings in the plate 70 and is disposed around the studs 60 and is intended to hold the hereinbefore mentioned instrumentalities between the two thrust bearings 62 and 69 in position. The upper end portion 72 of the studs 60 is arranged to embody an arcuate contour the utility of which will be set forth presently.

Screw-threadedly fitted on the upper end of the stud 50 is a yoke 73. One end portion of an arm 74 is pivotally connected in the yoke 73 as indicated at 75. The opposite end of the arm 74 has spaced apart rollers 76 and 77 mounted thereon which receive between them the arcuate portion 72 of the studs 60 in order that the rollers 76 and 77 may roll over this arcuate surface. Depending downwardly from the arm 74 is a web construction 78. Depending below the web construction 78 is a portion 79 which provides a pad portion 80. Rotatably mounted on the pad portion 80 are rollers 81 and 82 that receive between them the cam plate 68. The cam plate 68 and the rollers 81 and 82 are preferably made from a hardened material in order that wear thereon will be reduced to a minimum. In the web 78 a slot 83 is formed. A roller 84 is provided on the upper end of the arm 57 and is disposed in this slot 83 so as to be movable therethrough.

Rotatably journaled in the bearings provided in the web 54 is a drive shaft 85. Pinions 86 are provided on the drive shaft 85 that mesh with the pinions 64. On one end of the shaft 85 a gear 87a is provided which is connected in any suitable manner with instrumentalities on the crank shaft of the motor in order that operation of the crank shaft will be imparted to the shaft 85.

It is to be understood that while in the foregoing I have described but one stud 60 and one arm 74 as well as the co-operating parts therewith that a similar construction to that set forth hereinbefore is provided in alignment with each of the valve housings 14.

In Fig. 6 a diagrammatic layout of the cam plate 68 is shown. Herein it will be shown that the three hundred and sixty degrees of the cam surface is divided into four ninety-degree periods which are intended to correspond to the various cycles of a four cycle internal combustion engine. By referring to this view it can be seen that the ninety-degree periods which correspond to the compression and work strokes and which are indicated by 87 and 88 are arranged in the dwell portion of the cam plate 68. The intake phase of the cam is indicated by 90 and represents a drop in the cam while the exhaust portion is indicated by 89 and is represented by a rise in the cam. It is to be understood that the opposite ends of the cam as depicted in Fig. 6 are intended to be joined.

When power is supplied to the shaft 85 the pinions 86 are rotated and rotative movement thereof is imparted to the pinions 64 which in turn impart rotative movement to the cam plate 68, these pinions and cam plates being inter-connected as set forth hereinbefore. When the cam plate moves into a position so that the rollers 81 and 82 are resting on the portion 90 of the cam the parts will be disposed in the position depicted in Fig. 7. To so position the parts the arm 74 will rock about the roller 84 in the slot 83 and will act through the stem 50 to move the valve member 40 to the upper portion of the sleeve 32. At this time the piston 12 will start to move downwardly in the cylinder 11 which will obviously create a vacuum in the upper portion or explosion chamber 90a of the cylinder 11. When the valve member is disposed in this upward position connection is established between the passage 16 and the lower portion of the chamber 39. Therefore, the fuel will be drawn from the manifold 23 through the passages 30 and 22 into the recess 19 through the ports 35 and the openings 43a and down through the passage 41 in the valve member 40 into the lower portion of the chamber 39 from whence they will pass through the passage 16 into the explosion chamber 90a. By referring to the diagrammatic view Fig. 6 it may be seen that the cam plate 68 is arranged so that the valve member 40 will be quickly moved into this position it being apparent from the diagrammatic view Fig. 7 that the lower end of the portion of the valve member 40 is moved above the entrance to the passage 16. When the power piston 12 has reached its lower-most position the cam plate 68 is arranged so that movement is imparted to the valve member 40 in the manner set forth hereinbefore so that it is moved into a position substantially similar to that indicated in Figs. 3 and 8. The cam plate 68 will be disposed such that the rollers 81 and 82 are riding on the dwell thereof and therefore no movement will be imparted to the valve member 40. As the piston 12 moves upwardly it is apparent that the magnitude of the explosion chamber 90a is reduced and therefore the fuel stored therein will be compressed. At a time following that at which the piston 12 attains its upper-most position and passes dead center the spark plug 91 will operate in a manner well understood in the art to ignite the compressed fuel in the explosion chamber 90a which will drive the piston 12 downwardly. During this downward movement of the piston 12 which is the work stroke of the engine it is apparent that the rollers 81 and 82 will still be riding on the dwell portion of the cam plate 68. At the time the piston 12 attains its lower-most position and starts upwardly the rollers 81 and 82 will move on to the portion 89 of the cam plate 68 which will cause the valve member 40 to be moved into the position depicted in Fig. 9. As illustrated best in Figs. 3 and 4 the periphery of the valve member 40 has a recess 92 provided therein. When the valve member 40 is moved in the position depicted in Fig. 9 communication is established through this recess portion 92 between the passage 16 and the recess 20. Therefore as the piston 12 continues to move upwardly the burned gases will be forced from the cylinder through the passage 16, ports 37, recessed portion 92, ports 36, recess 20, and passage 31 into the exhaust manifold 24. The foregoing description describes a complete cycle of a four cycle engine and sets forth the relation between the valve member 40 and the piston 12. While this description describes but one cylinder and valve member it is to be understood that the operation of the remaining pistons and valve members will be substantially similar to that set forth but will operate in staggered relation with respect to the valve member described or as it is known in the art the various valve members will be timed with respect to each other.

A very important feature of my device is that the heated gases resulting from the explosion are forced out of the cylinder and pass around the valve member 40 in the recess 92. Obviously this tends to increase the temperature of the valve member 40. However, the incoming fuel is comparatively cool and as set forth this cool fuel is directed to the passage 41 interiorly of the valve member 40 and this therefore will tend to extract heat from the valve member and thus maintain this valve member in comparatively cooled condition and at the same time the temperature of the fuel will be increased so as to increase the efficiency thereof.

As has been set forth the arm 57 is arranged so that its position may be varied. Therefore by varying the position of the shaft 56 by motivating the bell crank lever 58 the arms 57 may be shifted relative to the slot 83. This varies the fulcrum point for the lever 74 and obviously this will vary the movement at the respective ends of said lever 74. I employ this arrangement to vary the amount of travel imparted to the valve member 40 for it is apparent that the greater amount of opening provided between the passage 16 and the chamber 39 the greater the amount of fuel will be drawn into the explosion chamber 90. Therefore by varying the position of the arm 57 I vary the position of the valve member 40 during its movement and therefore a greater or less amount of fuel may be introduced into and exhausted from the explosion chamber 90 which will obviously vary the speed and power of the engine.

It is apparent that it is necessary for the stem member 50 to move in a straight line. In order to accomplish this I provide the arcuate portion 72 hereinbefore set forth. As the rollers 76 and 77 move over this arcuate portion 72 and when the arm 74 is actuated from the cam plate 68 the lateral position of the arm 74 due to the contour of the portion 72 is varied and this compensates for movement at the pivot point 75 such that the stem 50 moves in substantially a straight line.

It will be noted that the various openings in the ports 35, 36, and 37 are arranged so that the upper edge of one opening is in alignment with the lower edge of the other opening. Therefore as the valve member 40 reciprocates over these ports the various portions of the periphery thereof are all subjected to an equal amount of wear which would not be true if the ports were arranged in any other disposition.

If desired a suitable housing may be provided around the pinions 64 and 86 and the cam plate 68 and the rollers 81 and 82 and the various mechanisms associated with these main mechanisms and this housing member may be filled with a suitable hard oil or grease in order that the appurtenances set forth may be properly lubricated. An additional housing will be provided which is intended to be filled with a suitable lubricating oil so as to properly lubricate the various moving parts.

It is apparent from the foregoing description that I have provided a valve construction which may be effectively cooled and one which will tend to increase the temperature of the incoming fuel. Further, this valve member is arranged such that it may be quickly moved into open and closed positions and held in these positions during the phases of the cycles in which it is intended to be in these positions which obviously increases the efficiency of the engine. Further, the valve member is arranged so that the amount of opening thereof may be expeditiously varied in order that the operation of the engine may be controlled. It is also apparent that the device is relatively simple in construction and operation and is arranged so that the various working parts thereof may operate in a lubricant so as to reduce the wear thereon and at the same time these parts are arranged so that repair and replacement thereof may be easily carried out due to their expeditious arrangement.

While I have illustrated and described the preferred form of construction for carrying my invention into effect, this is capable of variation and modification, without departing from the spirit of the invention. I, therefore do not wish to be limited to the precise details of construction set forth, but desire to avail myself of such variation and modifications as come within the scope of the appended claims.

Having thus described my invention what I claim is new and desire to protect by Letters Patent is:

1. A valve construction for an internal combustion engine including a valve member adapted to control communication between the intake and exhaust manifolds and the cylinder of an internal combustion engine, means for motivating said valve member including a lever, a link member connecting said lever and said valve member, means for actuating said lever, and means for guiding said lever whereby said link member will be moved in a substantially straight line.

2. A valve construction adapted to control communication between the intake and exhaust manifolds and the cylinder of an internal combustion engine, means for motivating said valve member including a lever, a fulcrum about which said lever may pivot, and means for operating said lever including a rotatable cam disc.

3. A valve construction adapted to control communication between the intake and exhaust manifolds and the cylinder of an internal combustion engine, means for motivating said valve member including a lever, a fulcrum about which said lever may pivot, means for motivating said lever including a rotatable cam disc, and means for varying said fulcrum point whereby the amount of movement imparted to said valve member may be varied.

4. A valve construction adapted to control communication between the intake and exhaust manifolds and the cylinder of an internal combustion engine, means for motivating said valve member including a lever, a fulcrum about which said lever may pivot, means for motivating said lever including a rotatable cam disc, means for varying said fulcrum point whereby the amount of movement imparted to said valve member may be varied, means for connecting said lever to said valve member, and means for guiding said lever connection during its movement about said fulcrum whereby said connecting means will be moved in a straight line.

5. In combination with an internal combustion engine, means for interconnecting the intake and exhaust manifolds and cylinder of the internal combustion engine including a housing having a valve member reciprocally mounted therein whereby said valve member may be moved into varied positions to establish communication between said cylinder and said manifolds, means for reciprocating said valve member including a stem, means for guiding said stem for movement in a straight line, a lever, means for pivotally connecting said lever to one end of said stem, a fulcrum for said lever, means for imparting reciprocatory movement to said lever, and means for varying the location of said fulcrum whereby the movement imparted to said stem by said lever may be varied.

6. In combination with an internal combustion engine, means for interconnecting the intake and exhaust manifolds and cylinder of the internal combustion engine including a housing having a valve member reciprocally mounted therein whereby said valve member may be moved into varied positions to establish communication between said cylinder and said manifolds, means for reciprocating said valve member including a stem, means for guiding said stem for movement in a straight line, a lever, means for pivotally connecting said lever to one end of said stem, a fulcrum for said lever, a rotatable cam, follower members engaging said cam and carried by said lever whereby said cam may act to impart reciprocation to said lever, and means for varying the location of said fulcrum whereby the amount of movement imparted to said stem by said lever may be varied.

7. In combination with an internal combustion engine, means for interconnecting the intake and exhaust manifolds and cylinder of the internal combustion engine including a housing having a valve member reciprocally mounted therein whereby said valve member may be moved into varied positions to establish communication between said cylinder and said manifolds, means for reciprocating said valve member including a stem, means carried by said housing for guiding said stem for movement in a straight line and for preventing leakage thereby, a lever, means for pivotally connecting one end of said lever to said stem, a cam, followers carried by said lever and engaging said cam for imparting movement to said lever, a fulcrum for said lever disposed between the end thereof connected to said stem and the end portion carrying said followers, and means for moving said fulcrum to vary the location thereof whereby the amount of reciprocation imparted to said stem may be varied.

8. In combination with an internal combustion engine, means for interconnecting the intake and exhaust manifolds and cylinder of the internal combustion engine including a housing having a valve member reciprocally mounted therein whereby said valve member may be moved into varied positions to establish communication between said cylinder and said manifolds, means for reciprocating said valve member including a stem, means carried by said housing for guiding said stem for movement in a straight line and for preventing leakage thereby, a lever, means for pivotally connecting one end of said lever to said stem, a cam, followers carried by said lever and engaging said cam for imparting movement to said lever, a fulcrum for said lever disposed between the end thereof connected to said stem and the end portion carrying said followers, and means for moving said fulcrum to vary the location thereof whereby the amount of reciprocation imparted to said stem may be varied, and means at the end of said lever opposite that connected to said stem engaging a guide member, said guide member serving to position said lever during rocking about said fulcrum whereby the end thereof connected to said stem will be moved in a straight line.

9. In combination with an internal combustion engine, a housing, said housing having passages therein communicating with the explosion chamber of said internal combustion engine and with the intake and exhaust manifolds thereof, means for controlling communication between said passages including a reciprocatory valve member, means extended from said housing connected to said valve member, a lever, means for interconnecting said lever and the means extended from said housing, a fulcrum for said lever, an arm extending from said lever on the side of said fulcrum opposite that connected to said means, cam followers on said arm, a cam engaged by said cam followers, and means for rotating said cam whereby said followers will move over said cam to impart rocking movement to said lever about said fulcrum.

10. In combination with an internal combustion engine, a housing, said housing having passages therein communicating with the explosion chamber of said internal combustion engine and with the intake and exhaust manifolds thereof, means for controlling communication between said passages including a reciprocatory valve member, means extended from said housing connected to said valve member, a lever, means for interconnecting said lever and the means extended from said housing, a fulcrum for said lever, an arm extending from said lever on the side of said fulcrum opposite that connected to said means, cam followers on said arm, a cam engaged by said cam followers, means for rotating said cam whereby said followers will move over said cam to impart rocking movement to said lever about said fulcrum, and means for carrying the location of said fulcrum with respect to said cam followers.

11. In combination with an internal combustion engine, a housing, said housing having passages therein communicating with the explosion chamber of said internal combustion engine and with the intake and exhaust manifolds thereof, means for controlling communication between said passages including a reciprocatory valve member, means extended from said housing connected to said valve member, a lever, means for interconnecting said lever and the means extended from said housing, a fulcrum for said lever, an arm extending from said lever on the side of said fulcrum opposite that connected to said means, cam followers on said arm, a cam engaged by said cam followers, means for rotating said cam whereby said followers will move over said cam to impart rocking movement to said lever about said fulcrum, and means for guiding said lever during rocking movement about said fulcrum whereby the end portion of said lever opposite that carrying said arm will be moved in a straight vertical line.

12. In combination with an internal combustion engine, a housing, said housing having passages therein communicating with the explosion chamber of said internal combustion engine and with the intake and exhaust manifolds thereof, means for controlling communication between said passages including a reciprocatory valve member, means extended from said housing connected to said valve member, a lever, means for interconnecting said lever and the means extended from said housing, a fulcrum for said lever, an arm extending from said lever on the side of said fulcrum opposite that connected to said means, cam followers on said arm, a cam engaged by said cam followers, means for rotating said cam whereby said followers will move over said cam to impart rocking movement to said lever about said fulcrum, means for guiding said lever during rocking movement about said fulcrum whereby the end portion of said lever opposite that carrying said arm will be moved in a straight vertical line, and means for carrying the location of said fulcrum with respect to said cam followers.

13. In combination with an internal combustion engine, a head for the block thereof, said head having a passage therein communicating with the explosion chamber of a cylinder of said engine, a housing into which said passage is extended, said housing having passages therein communicating with the intake and exhaust manifolds of said engine, a valve member reciprocal in said housing for controlling communication between said first named passage and the passages extending to said manifolds, means for moving said valve member into position to bring about said communication, said last named means being carried by said head and including a lever, means for connecting said lever and said valve member, a fulcrum for said lever, and means for imparting rocking movement to said lever to move said valve member.

14. In combination with an internal combustion engine, a head for the block thereof, said head having a passage therein communicating with the explosion chamber of a cylinder of said engine, a housing into which said passage is extended, said housing having passages therein communicating with the intake and exhaust manifolds of said engine, a valve member reciprocal in said housing for controlling communication between said first named passage and the passages extending to said manifolds, means for moving said valve member into position to bring about said communication, said last named means being carried by said head and including a lever, means for connecting said lever and said valve member, a fulcrum for said lever, means for imparting rocking movement to said lever to move said valve member, and means for varying the position of said fulcrum whereby the amount of travel of the end portion of said lever connected to said valve may be varied.

In testimony whereof I affix my signature.

WILLIAM KARL GOSSE.